Apr. 10, 1923. 1,451,578
F. L. KYGER
SOLDERING IRON
Filed Feb. 26, 1921
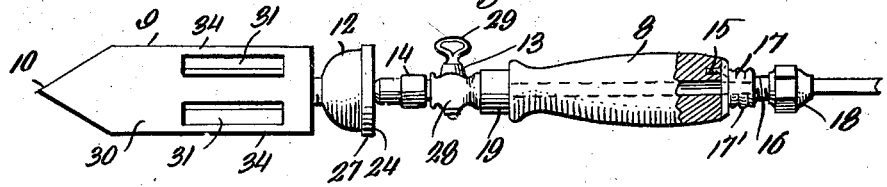
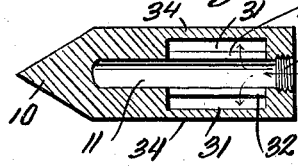 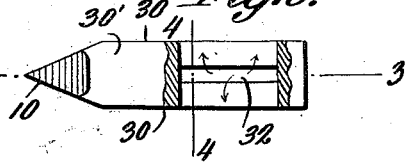
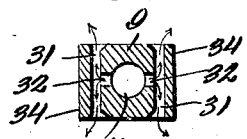
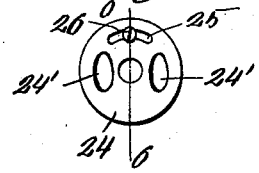 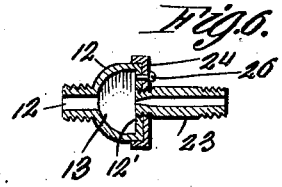
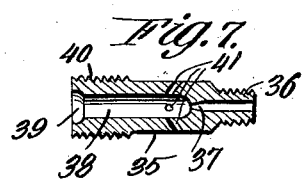
WITNESSES
FRANK L. KYGER INVENTOR.
BY
ATTORNEY.

Patented Apr. 10, 1923.

1,451,578

UNITED STATES PATENT OFFICE.

FRANK L. KYGER, OF STREATOR, ILLINOIS.

SOLDERING IRON.

Application filed February 26, 1921. Serial No. 448,091.

*To all whom it may concern:*

Be it known that I, FRANK L. KYGER, a citizen of the United States, residing at Streator, in the county of La Salle and State of Illinois, have invented certain new and useful Improvements in Soldering Irons, of which the following is a specification.

This invention relates to soldering irons of the internally heated type and aims to provide a complete iron which a workman can conveniently carry along with him wherever he may go, and which can be used equally well for bench work.

One of the principal objects of the invention is to provide a self-heated soldering iron having connection means for coupling it up with a gas tank whereby it is possible to use it wherever the services of a soldering iron is required.

An additional object is to provide a soldering iron of the character specified having interchangeable connections adapting it for use either with water, coal or natural gases, such connections being also interchangeable to transform the iron into a torch, when desired, for welding small materials.

A further object is to provide a soldering iron so constructed as to utilize the heat of the flame to the maximum extent and without any tendency to "smoke" the work; means being provided for regulating and adjusting the flame to heat the iron to the desired degree, and without the necessity of laying the tool down.

An additional object is to provide an internally heated iron having guard means so designed so as to permit working close to the iron without burning or scorching the fingers.

In addition to the above, the invention further contemplates the provision of a tool so constructed as to have the capacity of two soldering irons instead of only one; either iron being brought into proper position for use simply by the turning of the tool in the hand of the user.

With the above and other objects in view, the invention may be said to reside generally in the details of construction, combination and arrangement of parts, as will be hereinafter more fully pointed out and described, reference being had to the accompanying drawings, wherein—

Figure 1 is a side elevation of the soldering iron, constructed in accordance with the invention, Figure 2 is a vertical longitudinal section through the soldering head, Figure 3, a longitudinal edge view of the soldering head, partly in section to disclose the flame-exhaust, Figure 4, a transverse vertical section, taken on the line 4—4 of Figure 3, Figure 5, a plan view of the air-control or shutter plate of the gas burner, Figure 6, a vertical, longitudinal sectional view of the gas burner, and Figure 7, a vertical longitudinal view of the gas burner.

The handle 8 and the soldering head 9 of the soldering iron are both bored internally to provide a longitudinally extending gas and flame passage running the entire length of the handle and terminating rearwardly of the soldering point 10 of the head to provide, in the latter, a flame chamber 11. Between the handle and the soldering head is located gas and flame controlling means which regulate the flow of gas and adjust the flame so as to control the heating of the soldering head. The control means includes a burner 12 and a gas cock or shut-off 13, having a connecting coupling 14.

At its outermost end, the handle is provided with a square face, against which rests the base flange of a casting which may be screwed or otherwise fastened to the handle, as indicated at 15. This casting is provided with a projecting portion terminating in a screw threaded shank 16 and provided, inwardly of the threaded shank, with a raised portion 17 having a spiral thread or bead 17' as shown. The purpose of the casting is to enable the soldering iron to be connected up with a suitable source of supply, the beaded portion offering means for attachment to a gas hose when the tool is used for ordinary purposes and the screw threaded shank enabling a gas hose connection, such as indicated at 18, to be connected up with the handle when the gas is applied from a gas tank. The casting is, of course, provided with a central bore having alignment with the passage of the handle to provide an unobstructed passage way for the flow of the gas from the hose connection into and through the handle. At its inner end, the handle is provided with a ferrule 19, internally threaded for threaded engagement with the gas-cock of the regulating means.

The regulating means includes the burner 12 having a mixing chamber 13, wherein the mixture is ignited and burns all the way through to the flame chamber 11 of the soldering head. The burner is connected to the soldering head by means of a nipple 21, threaded externally for engagement with the threads 22 of the head. The mixing chamber of the burner may be bell-shaped, as shown in the drawings, and is provided with its front wall 12' apertured centrally and threaded for engagement with the threaded end of a needle valve casing 23; the oppositely threaded end of the casing having engagement with the valve body of the gas-cock, as shown to advantage in Figure 1 of the drawings. Mounted to rotate about the valve casing as an axis, and fitting close up against the wall of the mixing chamber is an air-control or shutter plate 24, having air inlet port 24'. This shutter is adapted to normally cover suitable air ports provided in the front wall of the mixing chamber and is slotted, as at 25, to receive a stop pin 26 which limits the sidewise adjustment of the shutter, when the latter is moved to cover or uncover the air ports, and thus increase or decrease the amount of air admitted into the burner. The air shutter is provided with a lateral flange 27 which embraces the peripheral edge of the burner and guides the shutter in its adjustment. The gas shut-off includes a valve body 28 having a valve mounted therein and operable by means of a handle 29 formed on the valve stem. By means of the gas-cock, the flow of gas to the burner is regulated and, it is to be noted, that the same is located immediately in front of the handle so as to be adjustable by the same hand that grips the handle, thus rendering the adjusting operation simple and convenient. This is of particular advantage to a workman when he has both hands occupied, and it is desired to adjust the flame without stopping work or laying the tool down. The gas flows through the needle valve casing and mixes with the air in the mixing chamber of the burner so that, when ignited, it spurts forth in a jet of flame extending through the nipple and into the flame chamber of the soldering head where it serves to heat the iron for soldering purposes.

The soldering head 9 of the tool is substantially of rectangular cross section as shown to advantage in Figure 4 of the drawing, and is provided with square faces of relatively broad and narrow width, as indicated at 30 and 30', respectively. These faces cooperate with the soldering point 10 to provide a soldering iron capable of being used where ordinarily several tools of varying sizes would be required. The invention therefore provides the services of at least two irons instead of one, since when one size iron is desired, the tool may be turned so that the head is edgewise, and when a larger size is desired, the head is turned flat ways. To provide exhaust for the flame chamber of the soldering head the same is slotted to provide outlet spaces 31 on opposite sides of the flame chamber and communicating therewith through exhaust slot 32. The reason for providing slots, rather than openings for the exhaust is to permit the soldering head to be cast in one piece and to avoid machine work. The flame chamber 11, it is to be noted, extends inwardly of the soldering head beyond the exhaust outlet and enables the flame to be directed with great force against the rear of the soldering point, thus concentrating most of the heat at the place where it is most needed to quickly and adequately heat the point to the desired degree. A great percentage of the heat, however, ordinarily escapes through the outlet leading from the flame chamber without much benefit having been derived therefrom and consequently must constitute a loss. To prevent this, flame guards or baffle plates are provided above the flame outlet 32 and serve to prevent the flame from coming out all around the soldering head, besides tending to prevent the workman's hand and fingers from being burnt or scorched thus permitting him to work close to the iron. Moreover, on account of the surplus fire or flame striking against the baffle plates, it is possible to heat the soldering iron in a comparatively short time, the tool retaining the heat for sometime even after the gas has been shut down. While the baffle plates may be of any suitable construction, in the preferred embodiment of the invention they are made integral with the soldering head and form the outer walls of the outlet passages 31. These baffle plates are indicated by the numeral 34 in the several views of the drawings.

When the tool is heated by natural gas or the like, a gas mixer and burner of the type illustrated in Figure 6 of the drawings is used. However, to use the soldering iron in connection with a gas tank, a special burner or gas mixer of the type illustrated in Figure 7 must be employed, together with hose connection 18. This special burner comprises an elongated tubular body 35 having a reduced neck portion 36 exteriorly threaded for engagement with valve body 28 and bored internally to receive a needle valve of conventional type. The needle valve opening 37 communicates with the terminal end of an elongated recess 38 which constitutes the mixing and flame chamber of the burner. This chamber is provided with a flared end 39 which permits the flame to spread out when the soldering head is disengaged from the burner. The burner is exteriorly threaded as at 40, for engagement with threaded socket 22 of the soldering head and is provided with air ducts 41 converging inwardly of the burner and in communication with the flame chamber, in proximity to the needle valve opening. The gas admitted into the flame chamber through the needle valve thus mixes with the air at this point and when ignited forms a jet of flame spurting from the flared end of the burner. The gas burner can, of course, be used interchangeably with the natural gas burner and the manner of coupling them in place between the handle and the soldering head is exactly the same for both. The gas-cock is adapted to be used in connection with either burner and makes it possible to adjust the supply of gas to accord with the intensity of flame desired while the baffle plates of the head tend to utilize the heat of the flame to the maximum extent and, consequently, to eliminate heat-waste.

From the foregoing, it will be seen that the invention provides a soldering iron capable of being used either with gas or natural gas and that the change from one to the other may be instantly effected by reason of the interchangeable connections or burners. A noteworthy feature of the device is that it can be easily taken apart, since the various units are detachably connected and capable of being disconnected or coupled with little difficulty.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claim.

Having thus described my invention, what I claim as new and desire to secure by Letters Patent is:—

In a self-heating soldering iron, a head having a soldering point on one end thereof and provided with an inwardly extending axial bore terminating adjacent to the soldering point, the wall of the bore at the outer end thereof being internally threaded for the reception of a gas pipe connection, the head having a pair of spaced parallel slots therein disposed on opposite sides of the bore and terminating short of the opposite ends thereof and arranged in relative close proximity to certain side walls of the head and opening out through certain other side walls of the head, and means for establishing communication between the axial bore and the said parallel disposed slots.

In testimony whereof I affix my signature in presence of two witnesses.

FRANK L. KYGER.

Witnesses:
WILLIAM J. BUTLER,
Mrs. FRANK KYGER.